United States Patent
Liardet

(10) Patent No.: US 6,581,078 B1
(45) Date of Patent: Jun. 17, 2003

(54) RANDOM NUMBER GENERATING CIRCUIT AND PROCESS

(75) Inventor: Pierre-Yvan Liardet, Peynier (FR)

(73) Assignee: STMicroelectronics SA.A., Gentilly (FR)

(*) Notice: Subject to any disclaimer, the term of this patent is extended or adjusted under 35 U.S.C. 154(b) by 0 days.

(21) Appl. No.: 09/478,104

(22) Filed: Jan. 4, 2000

(30) Foreign Application Priority Data

Jan. 18, 1999 (FR) .......................................... 99 00447

(51) Int. Cl.$^7$ ............................................... G06F 1/02
(52) U.S. Cl. ..................................................... 708/250
(58) Field of Search ............................... 708/250–256, 708/2; 380/46; 331/78

(56) References Cited

U.S. PATENT DOCUMENTS

| | | | | |
|---|---|---|---|---|
| 4,661,980 A | * | 4/1987 | Byram | ...................... 380/46 |
| 5,057,795 A | * | 10/1991 | Napier | ...................... 331/78 |
| 5,592,587 A | * | 1/1997 | Kunoff et al. | ............... 708/253 |
| 5,627,775 A | * | 5/1997 | Hong et al. | .................. 708/250 |
| 6,266,413 B1 | * | 7/2001 | Shefi | ........................... 380/46 |
| 6,324,558 B1 | * | 11/2001 | Wilber | ...................... 708/250 |
| 6,327,661 B1 | * | 12/2001 | Kocher et al. | ................. 380/46 |

* cited by examiner

*Primary Examiner*—Tan V. Mai
(74) *Attorney, Agent, or Firm*—Lisa K. Jorgenson; Allen, Dyer, Doppelt, Milbrath & Gilchrist, P.A.

(57) ABSTRACT

A random number generating circuit and process are provided with a physical noise source which produces digital signals which are combined with signals produced by a pseudo-random number generator. The combined signals are sent to the input of the pseudo-random number generator. The resulting digital signals are thus unpredictable while exhibiting the intended statistical characteristics. The random number generating circuit is suitable for cryptography.

48 Claims, 1 Drawing Sheet

RANDOM NUMBER GENERATING CIRCUIT AND PROCESS

FIELD OF THE INVENTION

The present invention relates to the field of cryptology and random number generation, and more particularly, the invention relates to a random number generating circuit and process which uses a noise source and a pseudo-random number generator.

BACKGROUND OF THE INVENTION

Cryptology can be defined as the science of concealing information. It is an essential aspect of security in chip cards (IC cards) alongside with the physical security of their components and operating systems. Cryptology encompasses cryptography, which is the art of ciphering and deciphering messages, and cyptanalysis (or deciphering), which is the art of cracking secret codes.

Random number generation is one of the essential tools of cryptology. Random number generation is used, for example, in certain cryptographic protocols. Some cryptographic algorithms involve the use of binary data grouped in words several bits in length. Sometimes the bits representing the data to be encoded are too few to form a number usable by a given cryptographic algorithm. It is then necessary to generate additional bits which, for security reasons, are generated in random fashion.

Random number generation is also used when a random analog value determined by a randomly generated number is needed. Signals which are observable from outside an electronic component can be disrupted in this way. For example, in IC cards, electrical signals are accessible from various buses upon loading a secret key into the IC card's registers. A secret key of an IC card is a set of parameters which enclose the secrecy of a cryptographic algorithm. The electrical signals can betray the key's confidentiality. By using a random analog value inside the IC card, it is possible to mask the perceptibility of some confidential information, in particular the information concerning the IC card's keys.

As another example, a random number generating circuit can be used with an electronic circuit whose characteristics need to be tested. In this case it is required to supply the circuit's input with a large number of input parameters, generated in a totally random fashion, throughout the circuit's operating range. In this way, it is possible to ensure that the performance of the electronic circuit under test is not optimized only for certain expected input parameters. The random number generation circuit and process can be used in all the above mentioned applications, as well as in any other application that requires random number generation.

Most often, physical sources of noise are at the heart of random number generation. These physical noise sources are then integrated into an electronic system, such as an IC card. The electronic system comprises at least one central processing unit which manages all the operations. Physical noise sources can comprise, for example, one or several shift registers which are sampled either at a fixed frequency different from the central processing unit's operating frequency, or at variable frequency.

Bits are thus generated in a more-or-less random fashion, often in groups of eight, to form bytes. The generated bytes, which are treated as numbers, can be exploited in circuits controlled by the central processing unit. Random numbers generated in this way should satisfy a certain number of basic empirical test properties as a function of cryptographic requirements. These can be distribution, equi-distribution, or increasing or decreasing sequence tests on the generated numbers.

It is possible that the physical noise sources do not have a sufficient level of performance to succeed in of all these tests. As an example, for reasons connected with the equipment used, in particular the presence of a clock cycling all the operations managed by the central processing unit, certain bit sequences may never, or only rarely, appear at the output of the physical noise source. In terms of probability, if an event corresponds to the generation of a random number, there is then no longer an equi-probability in the set of possible events.

As explained above, physical noise sources are most often unsatisfactory with respect to certain statistical properties to which random number generators must comply in order to perform satisfactorily in the field of cryptography.

SUMMARY OF THE INVENTION

It is an object of the present invention to overcome the above-described problems. To this end, the invention provides a random number generating circuit which uses a physical noise source and which generates a random number in binary form having sufficiently good statistical characteristics to be implemented satisfactorily in cryptography.

To meet these objectives, the invention provides a pseudo-random number generating circuit which receives a digital signal at an input. The digital signal corresponds to a number previously outputted by the pseudo-random number generator, and is modified by a digital signal delivered by the physical noise source. The circuit according to the invention thus takes advantage of the statistical characteristics at the output of an appropriate pseudo-random number generator which are most satisfactory. Moreover, the physical noise source is caused to disrupt the perfectly-determined sequence from a pseudo-random number generator to ensure that the numbers outputted from the circuit according to the invention have an unpredictable character.

The invention therefore concerns a random number generating circuit for generating, from a physical noise source, a random number in binary form. The random number generating circuit includes a logic circuit having a first input receiving digital input signals obtained from a physical noise source, and a pseudo-random number generator receiving an intermediate digital signal from the logic circuit. Also, the random number generating circuit includes a memory unit receiving a digital output signal from the pseudo-random number generator and supplying a digital return signal at a second input of the logic circuit, and an output interface receiving the digital output signal from the pseudo-random number generator.

In a specific embodiment of the circuit according to the invention, the logic circuit is a two-input exclusive-OR (EX-OR) gate. In some embodiments of the circuit according to the invention, the pseudo-random number generator is a linear congruence or inverse congruence pseudo-random number generator. According to another specific embodiment of the circuit according to the invention, the physical noise source is formed by shift registers in sufficient number to produce a digital input signal having a size adapted to the pseudo-a random number generator.

Another object of the invention is to provide a random number generation process for generating a random number in binary form, including the step of generating digital input signals from a physical noise source at a first input of a logic circuit. The process further includes producing a digital output signal, corresponding to a random number, at an output of a pseudo-random number generator, from a first digital input signal, and storing the digital output signal in a memory unit. Furthermore, the process includes combining a new digital input signal and a return digital signal corresponding to the content of the memory unit by a logic circuit each time a new digital input signal is generated. An intermediate digital signal obtained from the logic circuit is sent to the pseudo-random number generator, and a digital output signal is produced at the output of the pseudo-random number generator.

BRIEF DESCRIPTION OF THE DRAWINGS

The different aspects and advantages of the invention shall become more apparent from the following description with reference to FIG. 1, given purely as an example and which in no way limits the invention.

The sole FIGURE is a block a diagram of the random number generating circuit according to the invention.

DETAILED DESCRIPTION OF THE PREFERRED EMBODIMENTS

Figure 1:
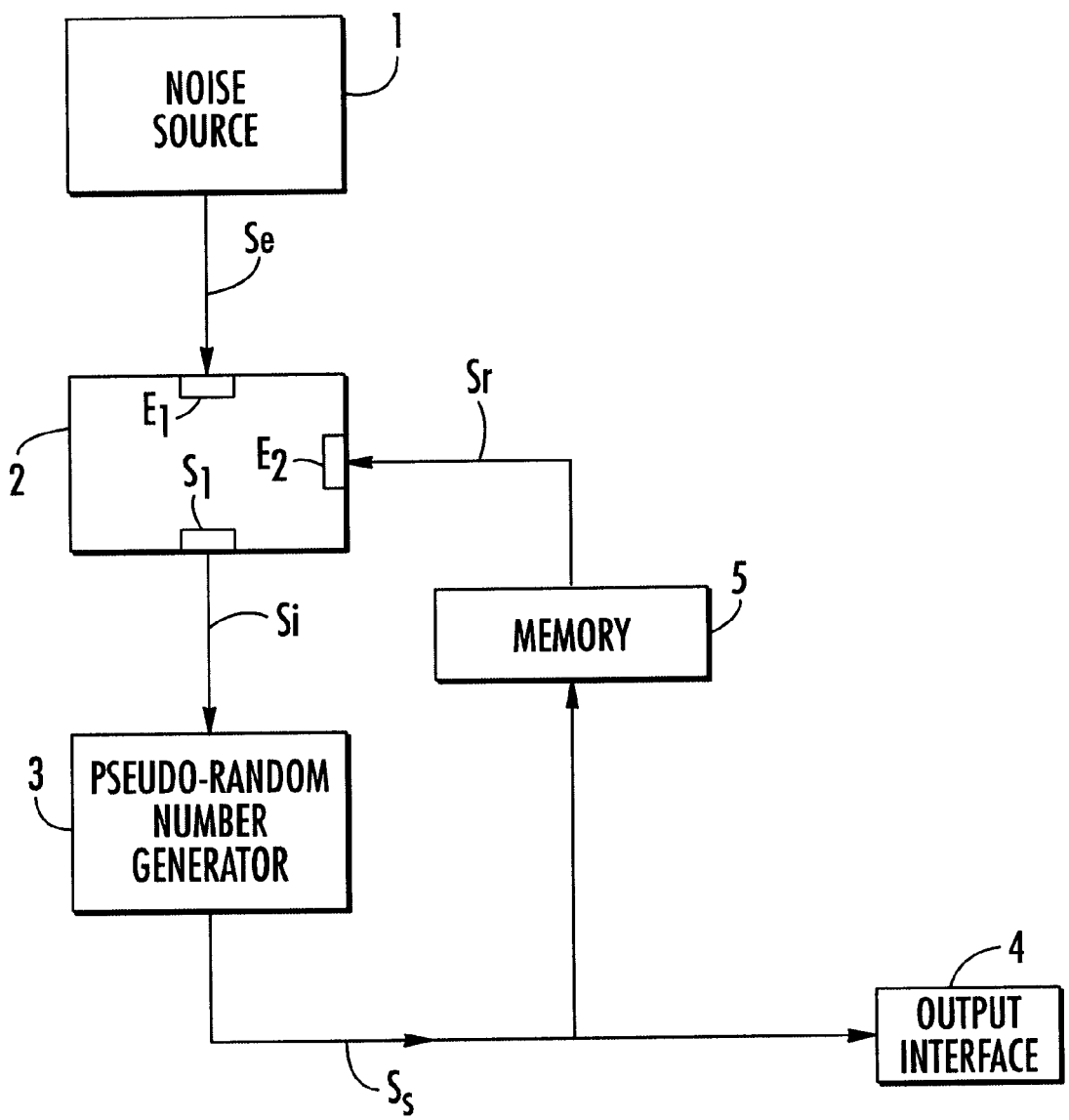

In the FIGURE, a physical noise source 1 delivers digital input signals Se. The digital input signals Se are sent to a first input E1 of a logic circuit 2. The logic circuit 2 delivers an intermediate digital signal Si at an output S1. A pseudo-random number generator 3 receives the intermediate digital signal Si from the logic circuit 2 as an input signal. The pseudo-random number generator 3 delivers a digital output signal $S_s$. The digital output signal $S_s$ is sent simultaneously to an output interface 4 and to a memory unit 5. The memory unit 5 is connected to a second input E2 of the logic circuit 2. The memory unit 5 can thus send a digital return signal Sr to the logic circuit 2.

The operating principle of the circuit according to the invention is as follows: the physical noise source sends out the digital input signals Se at different instants. The time interval which elapses between the generation of two digital input signals by the physical noise source 1 is not necessarily constant. This digital signal generation corresponds to the physical noise source 1 outputting a certain number of bits in accordance with above-described principle. In most cases, the bits are generated in groups of eight or sixteen bits so as to correspond to the signal format accepted at the input of the pseudo-random number generator 3.

Each generated digital input signal is sent to the first input EI of the logic circuit 2. At the same time, the contents of memory 5 are sent to a second input E2 of the logic circuit 2. If no data are available from the memory 5 at the moment a digital input arrives at the first input of the logic circuit 2, the logic circuit 2 sends an intermediate digital signal similar to the input digital signal. This situation can occur for the generation of a first random number, for instance. However, if the memory unit 5 is not empty when a first random number is generated, it sends a return signal Sr to the logic circuit 2 while emptying the contents of its memory.

According to another embodiment of the invention, the memory unit sends its information content to the logic circuit 2 in the form of a digital return signal $S_r$ as soon as the memory receives a new digital signal $S_s$. The input digital signal and, where applicable, the return digital signal are combined in the logic circuit 2. In all cases, the content of the memory unit is erased immediately upon receiving a new digital output signal coming from the pseudo-random number generator.

In a preferred embodiment of the invention, the logic circuit 2 is formed by a single two-input exclusive-OR gate. The choice of a simple exclusive-OR gate can be explained by the ease of implementation and the truth table of such a logic gate. Indeed, if a two-input exclusive-OR gate is exposed to all the possible combinations of input signals, its output produces a balanced distribution of logic zero and logic one bits. Such a balanced distribution is observed neither with an AND gate nor with an OR gate.

It can however be envisioned to have a logic circuit 2 composed of several elementary logic gates forming a complex logic circuit in order to improve the statistical characteristics of the intermediate digital signals, should the inputted digital signals prove to be statistically unsatisfactory in terms of equality of probability.

The intermediate digital signals are sent to the pseudo-random number generator 3. There are several types of pseudo-random number generators available, and whose statistical characteristics are completely known. In a preferred embodiment, the random number generating circuit according to the invention employs a linear congruence pseudo-random number generator. Such a pseudo-random number generator is characterized by a relationship between its output signal and its input signal which takes the form: $x_{n+1}=a \cdot x_n+b$ (mod c). Here, $x_{n+1}$ designates the last value of the output signal, which is a function of previous value of the output signal $x_n$. The choice of coefficients a, b and c depends on the statistical characteristics required at the output of the pseudo-random number generator. Their method of determination is known and does not need to be discussed here.

According to another embodiment of the invention, a known inverse congruence type of pseudo-random number generator can be used. More generally, the circuit in accordance with the present invention can be implemented with any pseudo-random number generator having satisfactory statistical characteristics in terms of equiprobability, rising and decreasing sequences, and in terms of distribution over the set of possible values.

A pseudo-random generator is not sufficient, however, for generating series of numbers which are unpredictable. Indeed, it is possible to characterize the mathematical function of a pseudo-random number generator merely by knowing a few of the values it delivers. For instance, in the case of a linear congruence pseudo-random generator, the above-mentioned coefficients a, b and c can be determined from three of its output values. The subsequent values generated by the pseudo-random number generator are then perfectly. predictable, and all the more so since the operation of a pseudo-random generator is inherently cyclical. The quality of protection of a circuit is then diminished if it relies on the unpredictable nature of a parameter. In the invention, the circuit's feedback loop through the memory unit 5 allows the reintroduction of the output digital signal, to ensure that the statistical properties of the pseudo-random number generator are conserved.

In other words, the contribution of a physical noise source breaks up the predictable sequence at the input, and hence at the output, of the pseudo-random generator 3. The combination of a physical noise and a pseudo-random noise generator 3 as implemented in the present invention makes it possible to exploit the good statistical characteristics of the pseudo-random noise generator while significantly modifying the input values so as to make the generated result unpredictable.

In another embodiment of the invention, it can be envisioned that the physical noise source does not send a digital input signal for a certain period. In such a situation, which can be accidental or perfectly controlled, the part of the circuit comprising the pseudo-random number generator 3, memory unit 5, logic circuit 2 and output interface 4 then behaves like a typical pseudo-random number generator.

As explained above, the physical noise source can be a shift register sampled at a frequency which does not correspond to the frequency of the central processing unit managing the overall circuitry. A number of shift registers may be used in association to produce the digital input signal, for instance when the pseudo-random number requires a large number of bits at its input. In this way, the pseudo-random number generator 3 is supplied with a digital signal adapted in size with respect to the number of bits. Each shift register is then considered as an elementary physical noise source. Moreover, the association of these shift registers can be effected so as to slightly improve the equiprobability of the values generated by the total physical noise source.

That which is claimed is:

1. A random number generating circuit for generating, from a noise source, a random number in binary form, the random number generating circuit comprising:
    a logic circuit having first and second inputs, the first input receiving a digital input signal from the noise source;
    a pseudo-random number generator for receiving an intermediate digital signal from the logic circuit;
    a memory for receiving a digital output signal from the pseudo-random number generator and for supplying a digital return signal to the second input of the logic circuit; and
    an output interface for receiving the digital output signal from the pseudo-random number generator.

2. A random number generating circuit according to claim 1, wherein the logic circuit comprises an exclusive-OR gate.

3. A random number generating circuit according to claim 1, wherein the memory supplies the digital return signal simultaneously with the digital input signal being produced by the noise source.

4. A random number generating circuit according to claim 1, wherein the memory supplies the digital return signal when the digital output signal is received from the pseudo-random number generator.

5. A random number generating circuit according to claim 1, wherein the pseudo-random number generator comprises a linearly congruent random number generator.

6. A random number generating circuit according to claim 1, wherein the pseudo-random number generator comprises an inversely congruent pseudo-random number generator.

7. A random number generating circuit according to claim 1, wherein the noise source comprises at least one shift register to supply the digital input signal having a size adapted for the pseudo-random number generator.

8. A random number generating circuit according to claim 1, wherein the noise source comprises a plurality of shift registers to supply the digital input signal having a size adapted for the pseudo-random number generator.

9. A random number generating circuit comprising:
    a noise source for generating a digital input signal;
    a logic device for receiving the digital input signal from the noise source and for generating an intermediate digital signal;
    a pseudo-random number generator for receiving the intermediate digital signal and for generating a digital output signal corresponding to a random number; and
    a memory for receiving the digital output signal and for supplying a digital return signal to the logic device.

10. A random number generating circuit according to claim 9, wherein the logic device comprises an exclusive-OR gate.

11. A random number generating circuit according to claim 9, wherein the memory supplies the digital return signal simultaneously with the digital input signal being generated by the noise source.

12. A random number generating circuit according to claim 9, wherein the memory supplies the digital return signal when the digital output signal is received from the pseudo-random number generator.

13. A random number generating circuit according to claim 9, wherein the pseudo-random number generator comprises a linearly congruent random number generator.

14. A random number generating circuit according to claim 9, wherein the pseudo-random number generator comprises an inversely congruent pseudo-random number generator.

15. A random number generating circuit according to claim 9, wherein the noise source comprises at least one shift register to supply the digital input signal.

16. A random number generating circuit according to claim 9, wherein the noise source comprises a plurality of shift registers to supply the digital input signal.

17. An encryption device comprising:
    a random number generating circuit including a noise source for generating a digital input signal, a logic device for receiving the digital input signal from the noise source, a pseudo-random number generator for receiving an intermediate digital signal from the logic device and for generating a digital output signal, a memory for receiving the digital output signal and for supplying a digital return signal to the logic device, and an output interface for receiving the digital output signal from the pseudo-random number generator.

18. An encryption device according to claim 17, wherein the logic device comprises an exclusive-OR gate.

19. An encryption device according to claim 17, wherein the noise source comprises at least one shift register to supply the digital input signal.

20. An encryption device according to claim 17, wherein the noise source comprises a plurality of shift registers to supply the digital input signal.

21. A method for generating a random number in binary form, comprising the steps of:
    generating a digital input signal from a noise source to a first input of a logic circuit;
    generating an intermediate digital signal from the logic circuit;
    producing a digital output signal, corresponding to a random number, at an output of a pseudo-random number generator, from the intermediate digital input signal;
    storing the digital output signal in a memory;
    providing a return digital signal from the memory to a second input of the logic circuit;
    combining the digital input signal and the return digital signal in the logic circuit each time a digital input signal is generated; and
    outputting the random number at an output interface which receives the digital output signal from the pseudo-random number generator.

22. A method according to claim 21, wherein the logic circuit comprises an exclusive-OR gate.

23. A method according to claim 21, wherein the memory supplies the digital return signal simultaneously with the digital input signal being produced by the noise source.

24. A method according to claim 21, wherein the memory supplies the digital return signal when the digital output signal is received from the pseudo-random number generator.

25. A method according to claim 21, wherein the pseudo-random number generator comprises a linearly congruent random number generator.

26. A method according to claim 21, wherein the pseudo-random number generator comprises an inversely congruent pseudo-random number generator.

27. A method according to claim 21, wherein the noise source comprises at least one shift register to supply the digital input signal having a size adapted for the pseudo-random number generator.

28. A method according to claim 21, wherein the noise source comprises a plurality of shift registers to supply the digital input signal having a size adapted for the pseudo-random number generator.

29. A method of generating a random number comprising the steps of:

generating a digital input signal;

generating an intermediate digital signal based on the digital input signal and a digital return signal;

generating a digital output signal corresponding to the random number based on the intermediate digital signal;

storing the digital output signal;

supplying the digital return signal based on the stored digital output signal; and outputting the random number.

30. A method according to claim 29, wherein the digital input signal is generated by a noise source.

31. A method according to claim 30, wherein the noise source comprises at least one shift register to supply the digital input signal.

32. A method according to claim 30, wherein the noise source comprises a plurality of shift registers to supply the digital input signal.

33. A method according to claim 29, wherein intermediate digital signal is generated by a logic device which receives the digital input signal and the digital return signal.

34. A method according to claim 33, wherein the logic device comprises an exclusive-OR gate.

35. A method according to claim 29, wherein digital output signal is generated by a pseudo-random number generator which receives the intermediate digital signal.

36. A method according to claim 35, wherein the pseudo-random number generator comprises a linearly congruent random number generator.

37. A method according to claim 35, wherein the pseudo-random number generator comprises an inversely congruent pseudo-random number generator.

38. A method according to claim 29, wherein the digital output signal is stored in a memory which supplies the digital return signal.

39. A method according to claim 38, wherein the memory supplies the digital return signal simultaneously with the digital input signal being generated.

40. A method according to claim 38, wherein the memory supplies the digital return signal when the digital output signal is received.

41. A method of making a random number generating circuit, the method comprising the steps of:

providing a noise source for generating a digital input signal;

providing a logic device for receiving the digital input signal from the noise source and for generating an intermediate digital signal;

providing a pseudo-random number generator for receiving the intermediate digital signal and for generating a digital output signal;

providing a memory for receiving the digital output signal and for supplying a digital return signal to the logic device; and providing an output interface for receiving the digital output signal from the pseudo-random number generator and for outputting a random number.

42. A method according to claim 41, wherein the logic device comprises an exclusive-OR gate.

43. A method according to claim 41, wherein the memory supplies the digital return signal when the digital input signal is generated by the noise source.

44. A method according to claim 41, wherein the memory supplies the digital return signal when the digital output signal is received from the pseudo-random number generator.

45. A method according to claim 41, wherein the pseudo-random number generator comprises a linearly congruent random number generator.

46. A method according to claim 41, wherein the pseudo-random number generator comprises an inversely congruent pseudo-random number generator.

47. A method according to claim 41, wherein the noise source comprises at least one shift register to supply the digital input signal.

48. A method according to claim 41, wherein the noise source comprises a plurality of shift registers to supply the digital input signal.

* * * * *

UNITED STATES PATENT AND TRADEMARK OFFICE
CERTIFICATE OF CORRECTION

PATENT NO. : 6,581,078 B1
DATED : June 17, 2003
INVENTOR(S) : Pierre-Yvan Liardet It is certified that error appears in the above-identified patent and that said Letters Patent is hereby corrected as shown below:

Title page,
Item [73], Assignee, delete "STMicroelectronics SA.A." insert -- STMicroelectronics S.A. --

Signed and Sealed this

Fourteenth Day of December, 2004

JON W. DUDAS
*Director of the United States Patent and Trademark Office*